United States Patent
Arvidson et al.

[11] Patent Number: 5,877,417
[45] Date of Patent: Mar. 2, 1999

[54] FLOW METER

[75] Inventors: Lawrence C. Arvidson, New Brighton; Duane A. Brown, Rockford, both of Minn.

[73] Assignee: Compucon Corporation, New Hope, Minn.

[21] Appl. No.: 808,001

[22] Filed: Mar. 3, 1997

[51] Int. Cl.[6] ................................................. G01F 1/20
[52] U.S. Cl. ................................................. 73/215; 73/223
[58] Field of Search .................. 73/200, 215, 861.04, 73/223, 304 R, 292

[56] References Cited

U.S. PATENT DOCUMENTS

| | | | |
|---|---|---|---|
| 3,216,251 | 11/1965 | Hansen | 73/223 |
| 3,370,466 | 2/1968 | Chang. | |
| 4,346,596 | 8/1982 | Diamant et al. | 73/215 X |
| 4,395,918 | 8/1983 | Wilson | 73/223 X |
| 4,429,581 | 2/1984 | Furmaga | 73/200 X |
| 4,476,719 | 10/1984 | Millar et al. | 73/215 X |
| 4,659,218 | 4/1987 | De Lasa et al. | 73/861.04 X |
| 4,860,592 | 8/1989 | Van Emden et al. | 73/861.08 X |
| 4,974,448 | 12/1990 | Icking | 73/223 X |
| 5,035,139 | 7/1991 | Hoefelmayr et al. | 73/215 X |
| 5,083,459 | 1/1992 | Lind et al. . | |
| 5,094,112 | 3/1992 | Hoefelmayr et al. | 73/223 X |
| 5,635,637 | 6/1997 | Boult et al. | 73/215 X |

*Primary Examiner*—William L. Oen
*Attorney, Agent, or Firm*—Haugen and Nikolai, P.A.

[57] ABSTRACT

A device and method for determining the flow rate of gas entrapped fluids delivered in a pulsating flow, such as milk, wherein the invention boasts an improved fluid level detection arrangement for determining flow rates with improved accuracy, and an improved temperature sensing arrangement for determining the temperature of the gas entrapped fluid with improved accuracy.

8 Claims, 10 Drawing Sheets

FLOW METER

BACKGROUND OF THE INVENTION

I. Field of the Invention

The present invention relates generally to devices for measuring flow rates. More particularly, the present invention relates to a device and method for determining the flow rate of gas entrapped fluids delivered in a pulsating flow, such as milk wherein the invention boasts an improved fluid level detection arrangement for determining flow rates with improved accuracy, and an improved temperature sensing arrangement for determining the temperature of the gas entrapped fluid with improved accuracy.

II. Discussion of the Prior Art

In recent years, it has become increasingly important for farmers to monitor and document the productivity of the cows within a given herd so as to ensure that dairy operations are being conducted with the highest degree of efficiency. A principal indicator of productivity is milk output, that is, the amount of milk that each cow is capable of rendering over a given period of time. By monitoring the milk output of each cow, a farmer can maximize the total amount of milk generated by the entire herd by singling out low-producing cows and replacing them with cows having greater ability to provide milk. Moreover, in that milk output is related to the overall health of a cow, farmers may also reduce the likelihood of having "tainted" milk enter the main holding tank by removing the low-producing, potentially ill cows from the milking herd, thereby improving the overall quality of the milk within the holding tank. In order to properly monitor milk output, it is essential to determine the true flow rate of the milk being delivered. However, obtaining an accurate assessment of flow rate during milking operations is particularly challenging due to the turbulent, pulsatile nature of the milk flow, as well as the foaming which results therefrom.

U.S. Pat. No. 5,083,459, issued to Lind et al., illustrates an exemplary metering device for determining the flow rate of gas-entrapped fluids delivered in a pulsating flow, such as the milk rendered from cows during dairy operations. The flow meter of the '459 patent includes a multi-section, separable housing having a velocity reduction chamber for reducing the velocity of the incoming milk, a turbulence reduction chamber for reducing the amount of turbulence of the milk flow and for separating out foam, and a measurement chamber having a plurality of vertically spaced probe members for measuring the fluid level of the milk passing therethrough. More specifically, a "common probe" fluid level detection arrangement is employed, wherein a base probe is disposed proximate the bottom of the measurement chamber for receiving a driving signal and the upper probes are monitored the determine when conductivity is established between the base probe and any of the upper probes due to the rising and falling of the fluid within the measurement chamber. In this fashion, the fluid level within the measurement chamber can be continuously tracked and further correlated into flow rate such that the milk output for each cow within a herd may be monitored and documented.

Although the physical structure of the housing is highly successful in reducing the turbulent, pulsatile fluid flow into a manageable fluid stream, the above-identified "common probe" fluid level detection arrangement occasionally results in inaccurate fluid level assessments when high and low fluid levels exist within the measurement chamber. As will be appreciated by those skilled in the art, this stems from the fact that the base probe is common to all fluid level measurements. More particularly, the impedance between the base probe and each upper probe is unique and fixed such that the impedance associated with a particular fluid level is different than the impedance associated with other fluid levels. By basing each fluid level determination on different base probe-to-upper probe impedances, the sensitivity of the "common probe" fluid level detection arrangement varies depending upon the particular fluid level. In practice, the varying sensitivity of the "common probe" fluid level detection arrangement may cause it to fail to detect when continuity is established between the base probe and the upper probes at high fluid levels, as well as detect continuity between the base probe and upper probes at low fluid levels when in actuality continuity has not been established. Missing continuity "hits" and detecting false continuity "hits" in this fashion causes the resulting determination of flow rate to be inaccurate and therefore less valuable in monitoring milk production.

In addition to monitoring milk production, agriculturalists oftentimes find it helpful to monitor the temperature of each cow within a herd as a way to further ensure that the cows are in good health for optimizing the milk production of the herd. The traditional technique for assessing cow temperature requires manually inserting a thermometer in the rectum and/or vagina of the cow so as to obtain a direct assessment of body temperature. While this method does provide highly accurate cow temperature assessments, it is nonetheless is disadvantageously time consuming as well as undesirably messy. To avoid these drawbacks, various efforts have been undertaken to monitor cow temperature via indirect means so as to eliminate the need for manually inserting thermometers in the cows as described above. For example, in the system disclosed in the '459 patent to Lind et al., a temperature sensing element is typically inserted into the fluid line extending between the milk flow meter and the holding tank to monitor the temperature of the milk being extracted from each cow. Milk temperature, it is found, provides a general indication of the temperature of the cow being milked. While this method for indirectly monitoring cow temperature is generally useful, it is nonetheless flawed in that the temperature sensing element is positioned a fair distance from the actual cow and requires permanently altering the fluid line to insert the temperature sensing element therein. Disposing the temperature sensing element distal to the cow in this fashion subjects the temperature sensing element to fluctuations unrelated to cow temperature, such as temperature variations within the milking parlor, such that the resulting milk temperature measurements may not accurately reflect the true temperature of the cow. Permanently altering the fluid line results in increased costs in terms of both the time required to alter the fluid line, as well as the cost of material.

A need therefore exists for an improved flow meter having an improved fluid level detection arrangement capable of consistently rendering accurate fluid level assessments for reliable flow rate determination. A further need exists for an improved flow meter having an internally disposed temperature sensing element for providing milk temperature assessments which accurately reflect the actual temperature of the cow.

SUMMARY OF THE INVENTION

It is accordingly a principal object of the present invention to provide an improved fluid level detection arrangement capable of consistently rendering accurate fluid level assessments for reliable flow rate determination.

It is yet another principal object of the present invention to provide an improved flow meter having an internally disposed temperature sensing element for providing milk temperature assessments which accurately reflect the actual temperature of the cow.

In accordance with the present invention, the foregoing objects and advantages are achieved by providing an improved flow meter for determining flow rates of pulsatile fluid flow. The improved flow meter comprises a fluid housing having a fluid inlet, a fluid outlet, a velocity reduction chamber in communication with the fluid inlet, a turbulence reduction chamber in communication with the velocity reduction chamber, and a fluid measurement chamber in communication with the velocity reduction chamber and the fluid outlet. The fluid measurement chamber has a plurality of electrically conductive probe members disposed in vertically spaced relation therewithin. Means are further provided for electrically determining conductivity between a preselected adjacent pair of the plurality of probe members as provided by the level of fluid within the measuring compartment. Means are also provided for converting the electrically conductive readings from the means for determining conductivity to a visual readout correlating to the flow of fluid through the fluid measurement chamber.

In yet another broad aspect of the present invention, the above-identified objects are obtained by providing an improved flow meter for determining flow rates of pulsed fluids, comprising a fluid container, processing means, and temperature sensing means. The fluid container is of generally hollow construction having a fluid inlet, a fluid outlet, and a fluid measurement chamber disposed between the fluid inlet and the fluid outlet having a plurality of vertically spaced probe members disposed therewithin. The processing means is communicatively linked to the plurality of probe members for automatically tracking a fluid level within the fluid measurement chamber based on the conductivity of the fluid extending between each pair of vertically adjacent probe members and for correlating the fluid level within the fluid measurement chamber to determine a flow rate of the fluid passing through the fluid measurement chamber. The temperature sensing means is disposed proximate the fluid outlet and is communicatively linked to the processing means for sensing the temperature of the fluid passing through the fluid outlet.

In still a further broad aspect of the present invention, the foregoing objects and advantages are obtained by providing a method of determining a flow rate of a fluid delivered in a pulsatile flow, comprising the steps of: (a) providing a fluid housing having a fluid inlet, a fluid outlet, a velocity reduction chamber in communication with the fluid inlet, a turbulence reduction chamber in communication with the velocity reduction chamber, a fluid measurement chamber in communication with the velocity reduction chamber and the fluid outlet, and a plurality of electrically conductive probe members disposed in vertically spaced relation within the fluid measurement chamber; (b) tracking the electrical conductivity between adjacent pairs of the plurality of probe members to determine an instantaneous fluid level within the fluid measurement compartment; and (c) calculating a flow rate based on the instantaneous fluid level within the measurement means.

The foregoing features and advantages of the present invention will be readily apparent to those skilled in the art from a review of the following detailed description of the preferred embodiment in conjunction with the accompanying drawings and claims.

BRIEF DESCRIPTION OF TILE DRAWINGS

Figure 10:
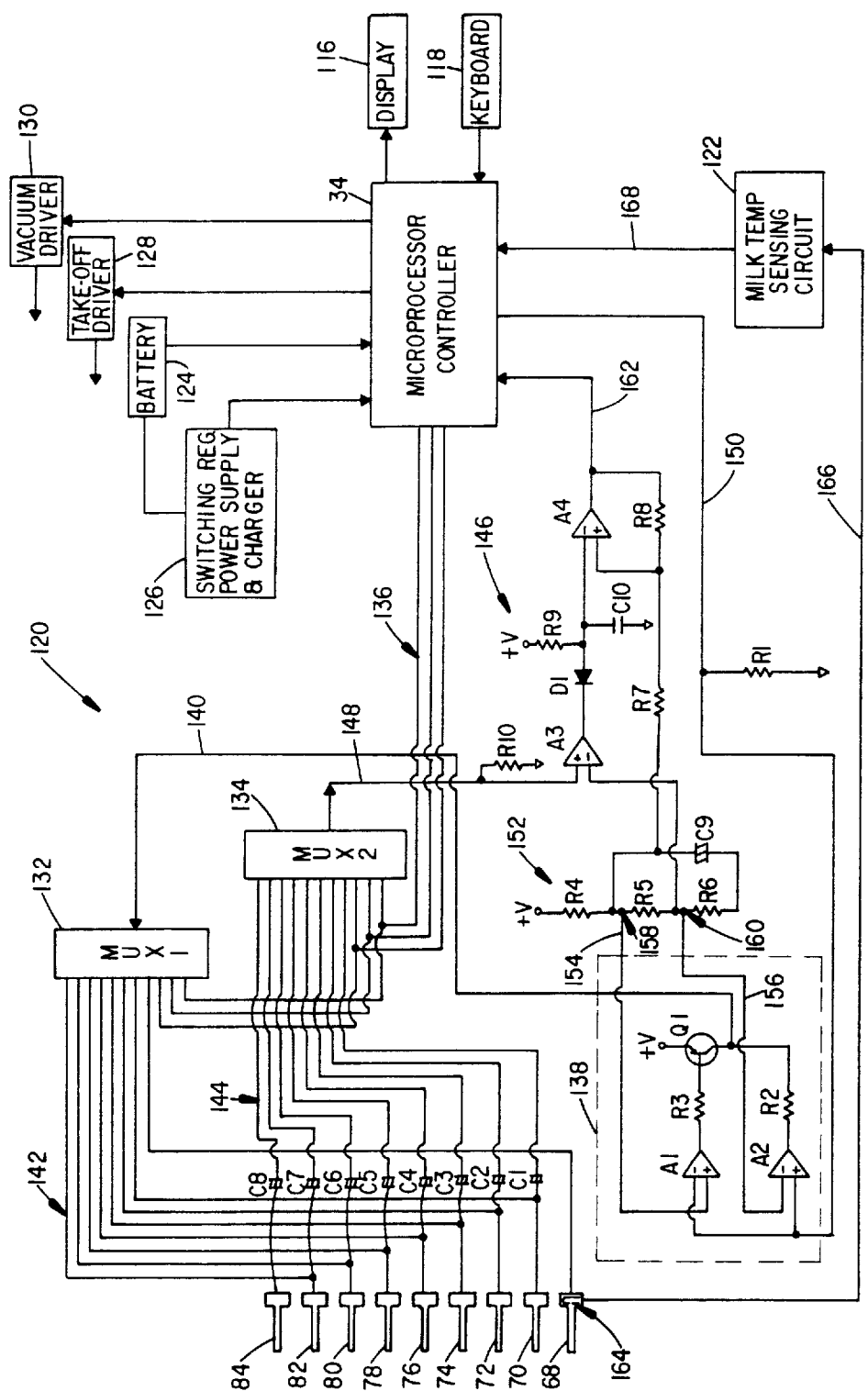
Figure 11:
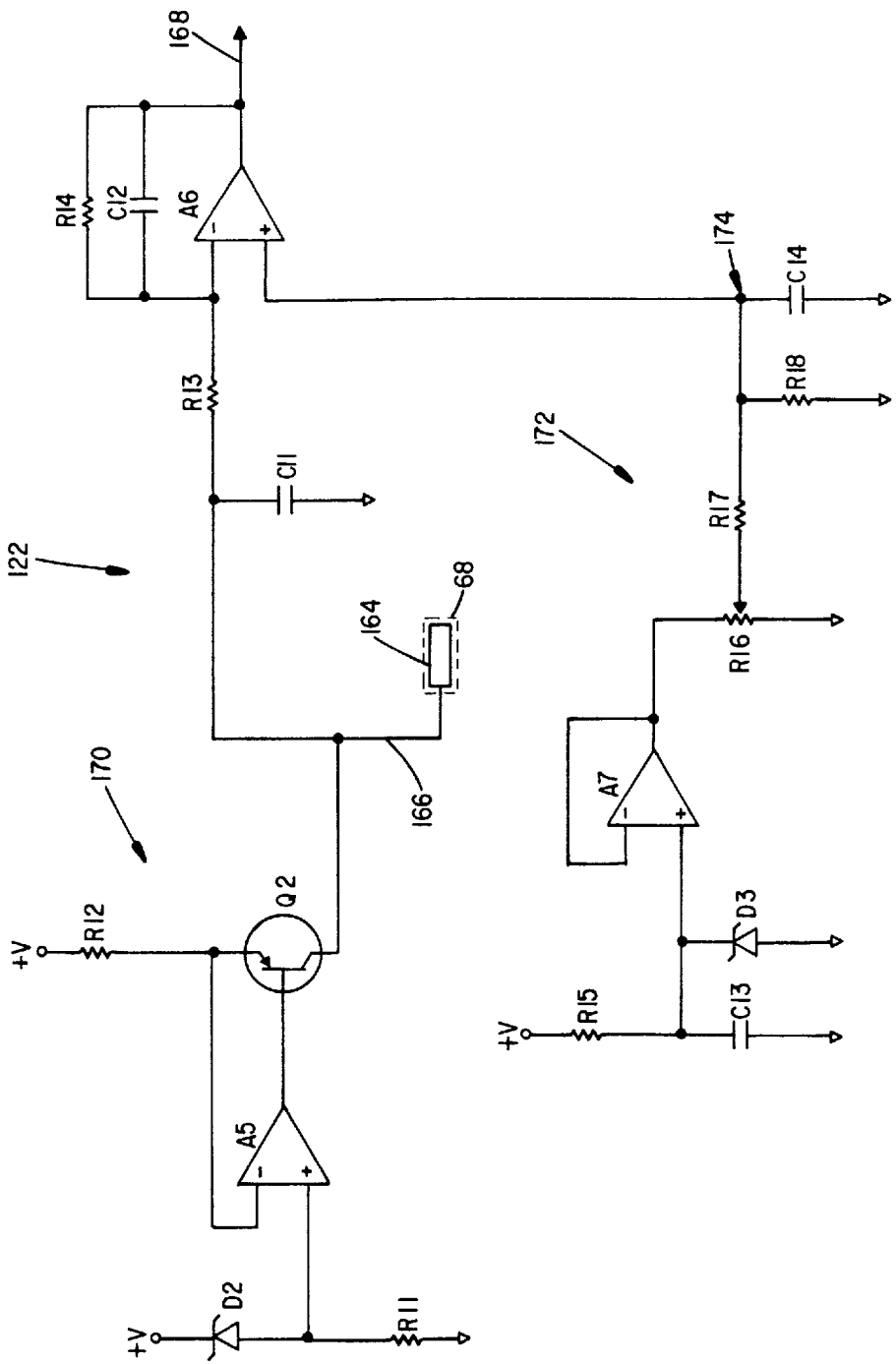

FIG. 10 is a schematic diagram illustrating the control circuit of the improved flow meter of the present invention, including an "adjacent probe" fluid level detection arrangement for determining milk flow rates with improved accuracy, and a temperature sensing module for determining milk temperature within the flow meter; and FIG. 11 is a schematic diagram illustrating the milk temperature sensing circuit within the temperature sensing module shown generally in FIG. 10.

DETAILED DESCRIPTION OF THE PREFERRED EMBODIMENTS

Figure 1:
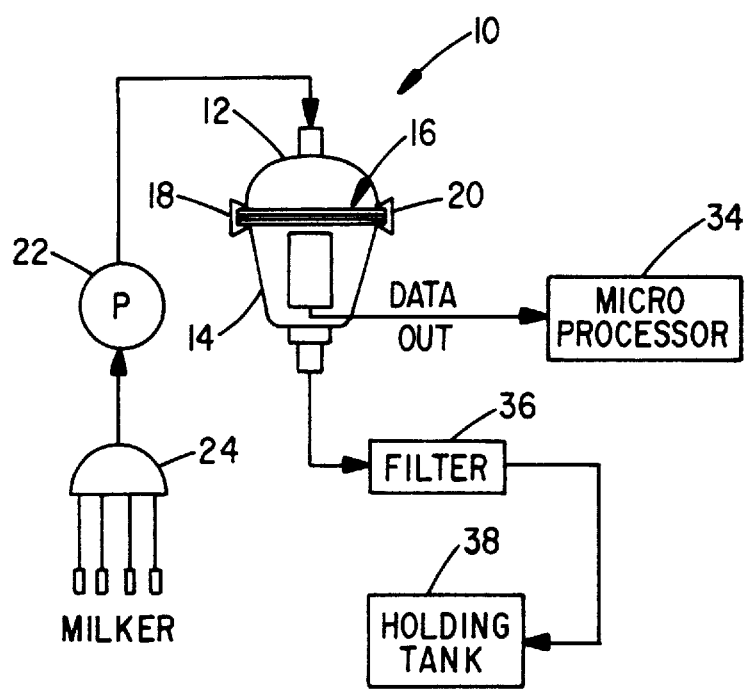
FIG. 1 is a block diagram of a milking system which incorporates an improved flow meter arrangement in accordance with the present invention.
Figure 2:
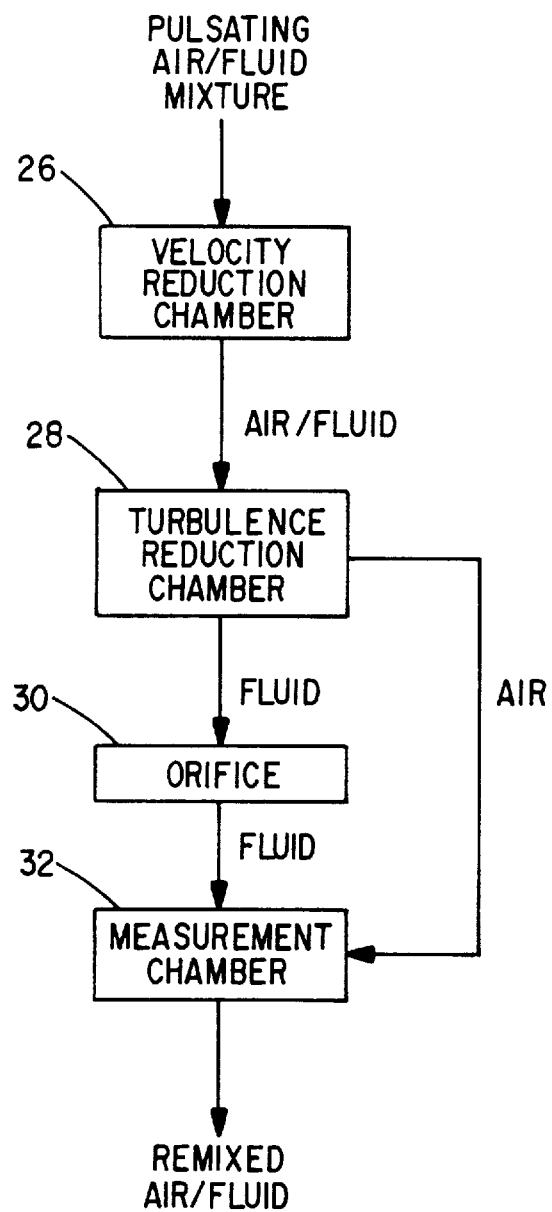
FIG. 2 is a block diagram illustrating the fluid management steps performed within the various chambers of the improved flow meter of the present invention.

Referring initially to FIG. 1, shown is an improved flow meter 10 constructed in accordance with a preferred embodiment of the present invention. The flow meter 10 comprises an upper housing member 12 and a lower housing member 14 which in use are sealably coupled about a baffle plate 16 via spring clips 18, 20. As will be explained in greater detail below, the upper and lower housing members 12, 14 are generally hollow in construction and include a variety of internally disposed structures for reducing the turbulent, pulsatile fluid flow from a milk pump 22 into a manageable fluid stream such that an accurate and reliable determination of milk flow rate can be obtained for a cow coupled to a milker 24. More specifically, with reference to FIG. 2, the upper housing member 12 includes a velocity reduction chamber 26, while the lower housing member 14 includes a turbulence reduction chamber 28, a metered orifice 30, and a measurement chamber 32. The velocity reduction chamber 26 is provided to reduce the velocity of the pulsating air/fluid mixture from the pump 22. The turbulence reduction chamber 28 serves to separate the air and fluid from the incoming air/fluid mixture from the velocity reduction chamber 26. The metered orifice 30 is disposed at the entrance of the measurement chamber 32 to provide a clean fluid flow transition from the turbulence reduction chamber 28 to the measurement chamber 32 to aid in proper flow rate determination. The measurement chamber 32 is equipped with a plurality of vertically disposed probe members (not shown) which, in conjunction with a microprocessor 34, track the level of the fluid within the measurement chamber 32 for the purpose of determining instantaneous flow rate. After passing through the measurement chamber 32, the air previously removed in the turbulence reduction chamber 28 is thereafter remixed with the fluid for further transmission to a filter 36 en route to a holding tank 38.

Figure 3:
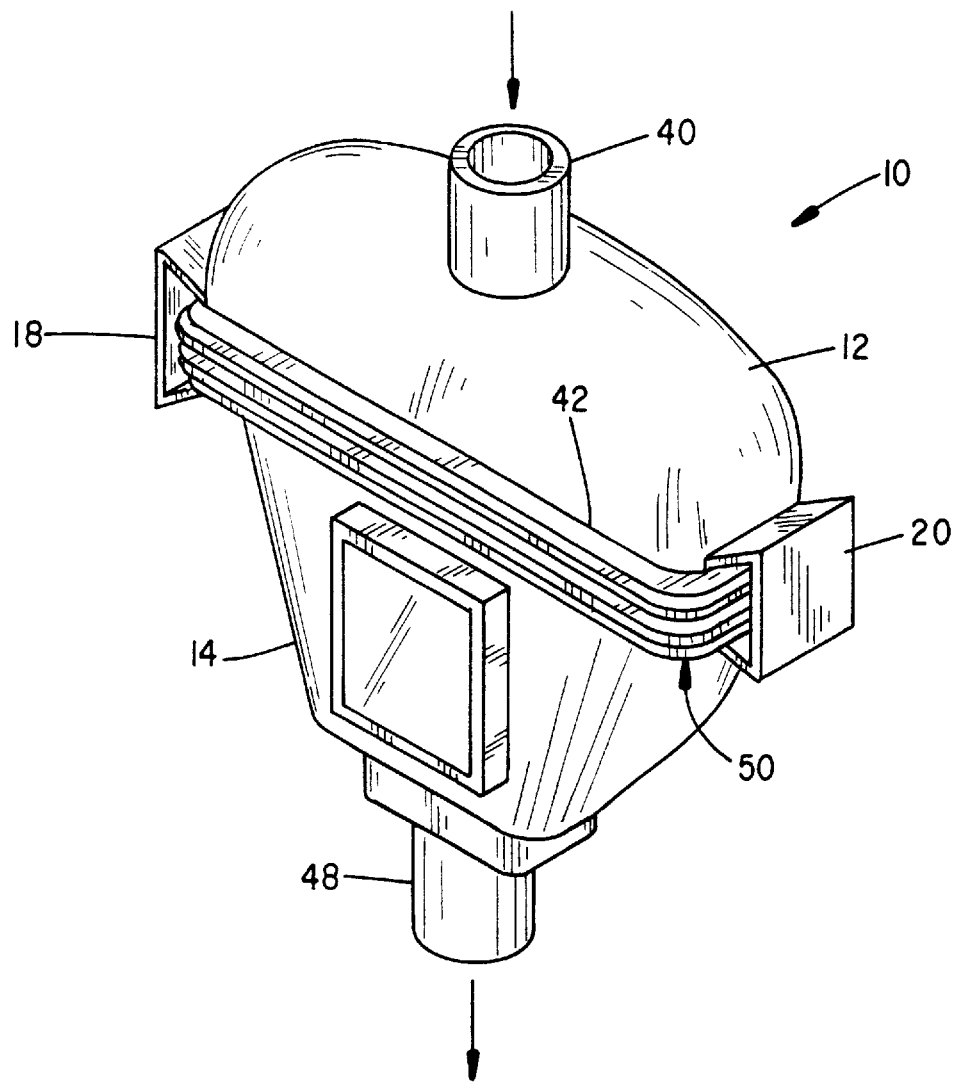
FIG. 3 is a perspective view of the improved flow meter of the present invention.
Figure 4:
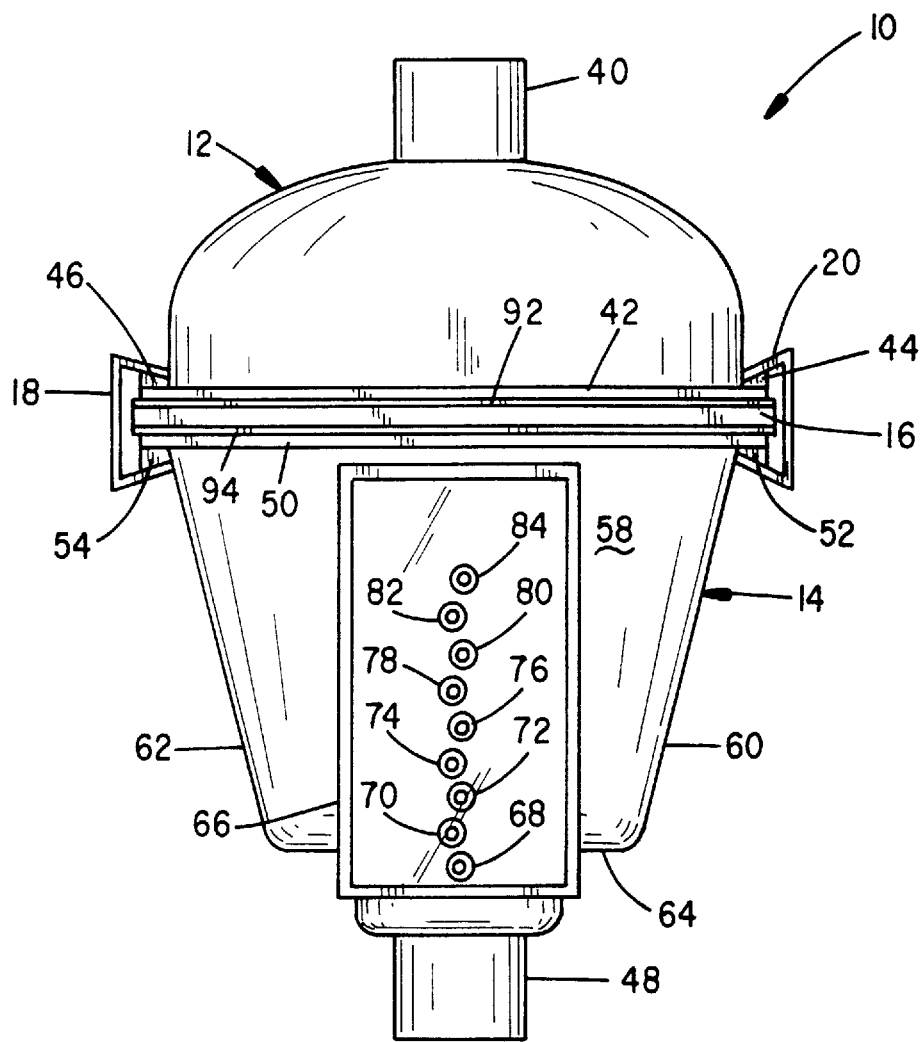
FIG. 4 is an elevation taken from one side of the improved flow meter.
Figure 5:
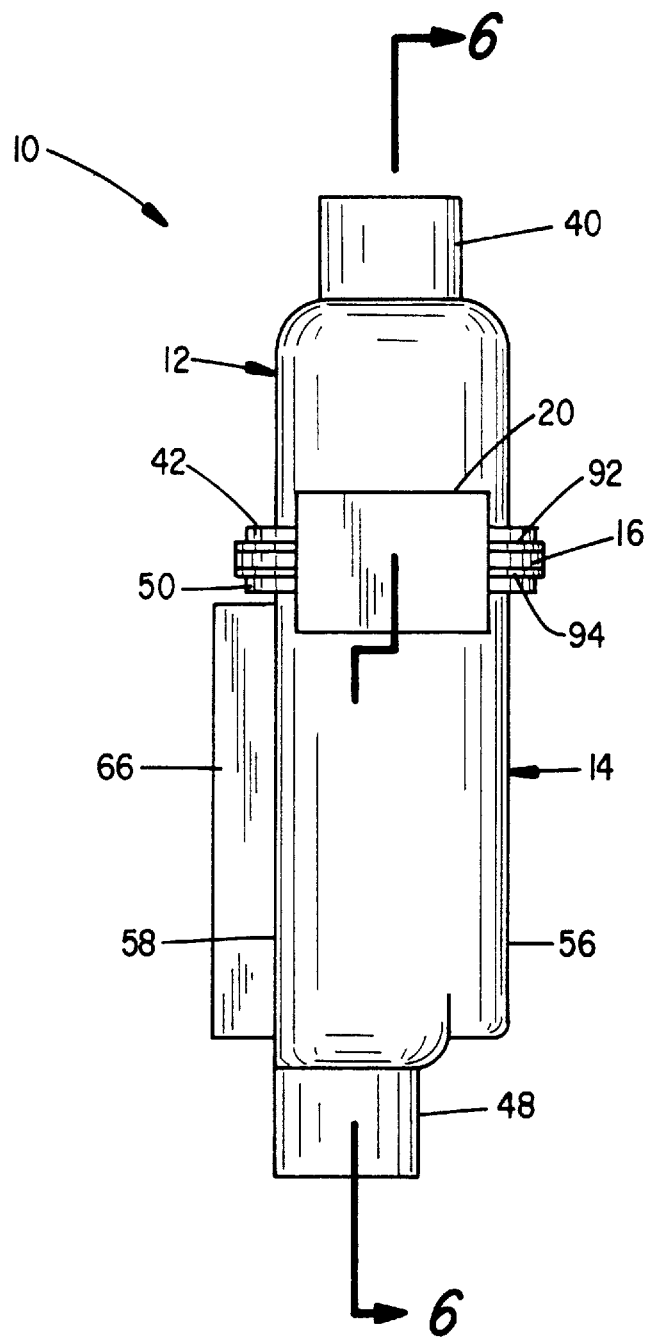
FIG. 5 is an end elevation of the improved flow meter as viewed in FIG. 4.
Figure 6:
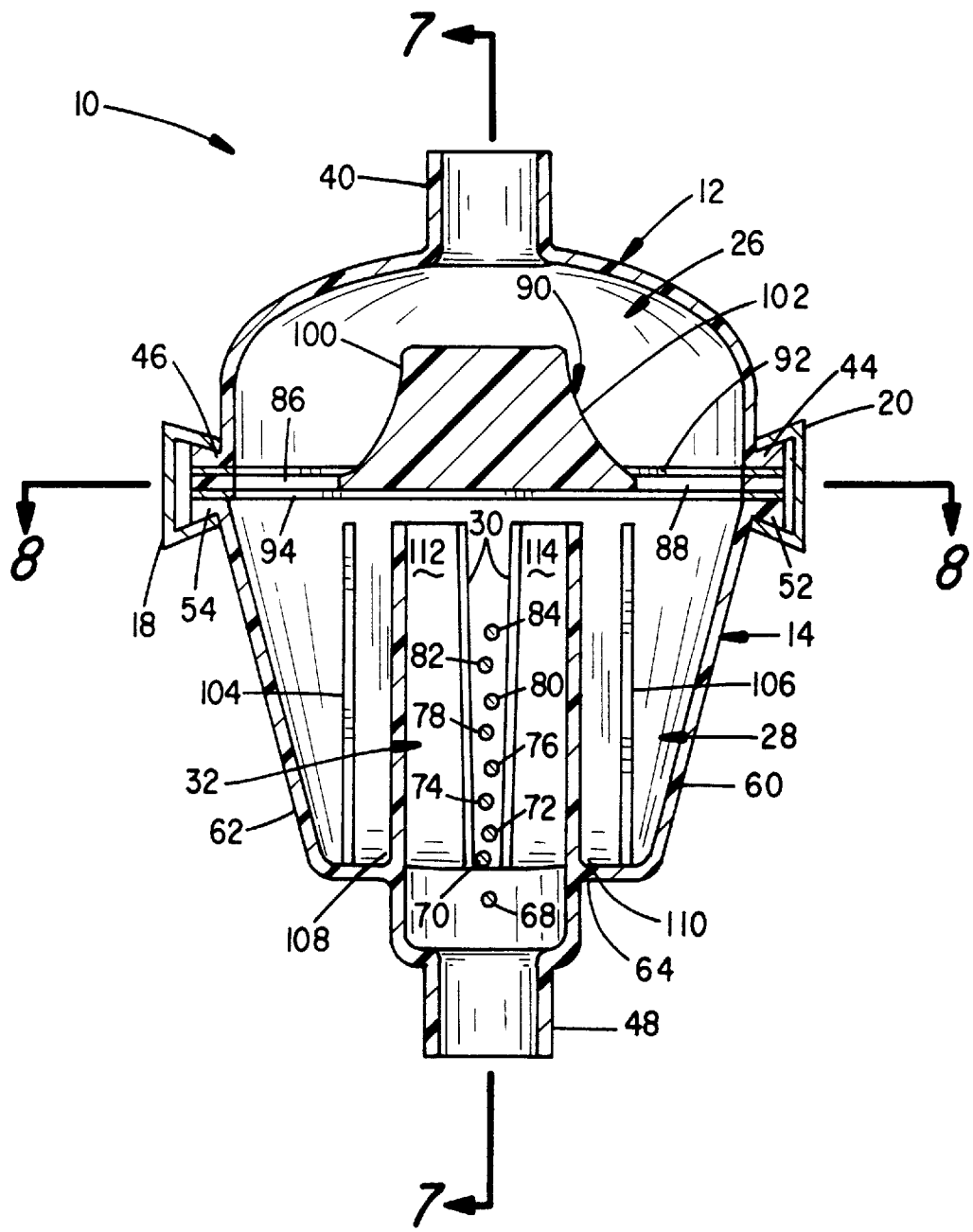
FIG. 6 is a sectional view of the improved flow meter taken along lines 6—6 in FIG. 5.
Figure 7:
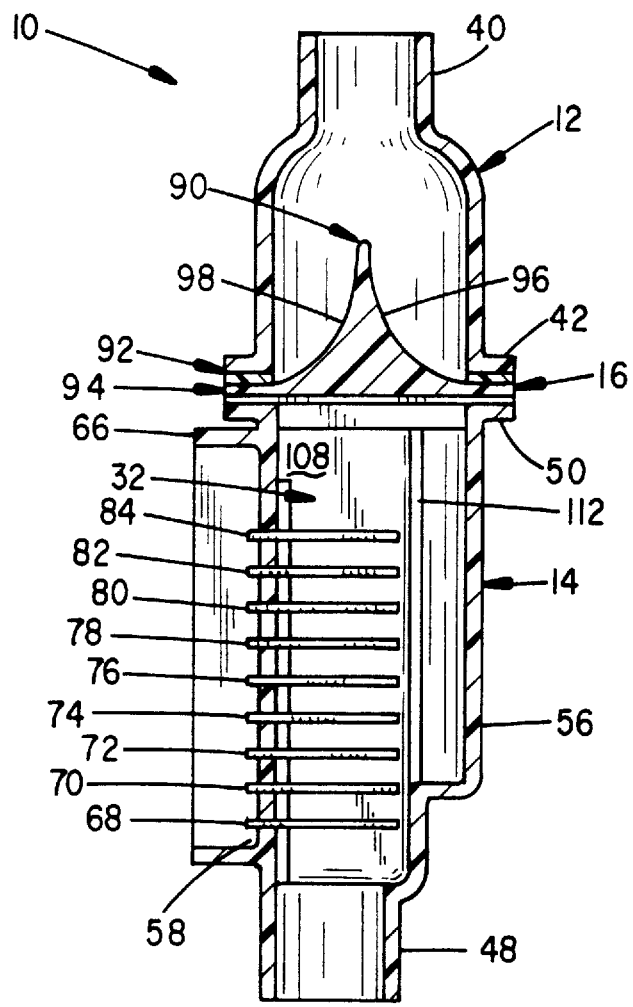
FIG. 7 is a sectional view of the improved flow meter taken along lines 7—7 in FIG. 6.
Figure 8:
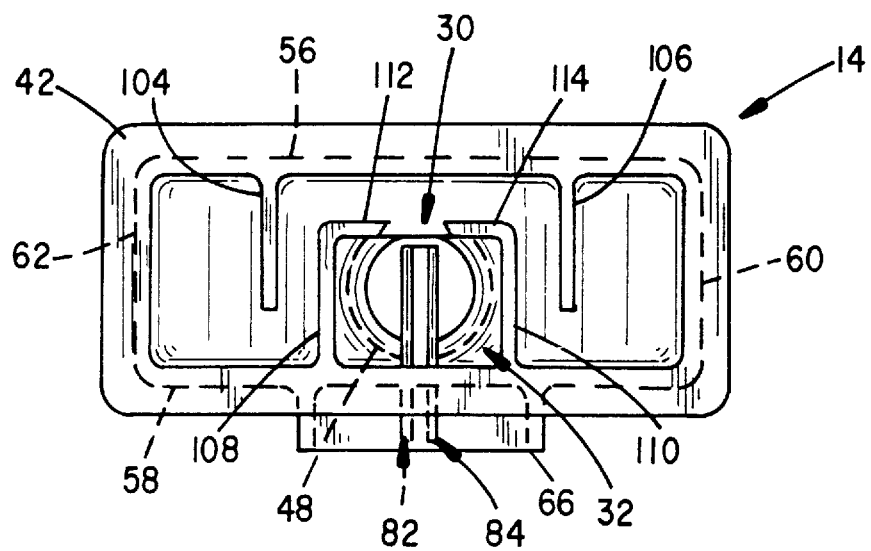
FIG. 8 is a sectional view of the improved flow meter taken along lines 8—8 in FIG. 6.
Figure 9:
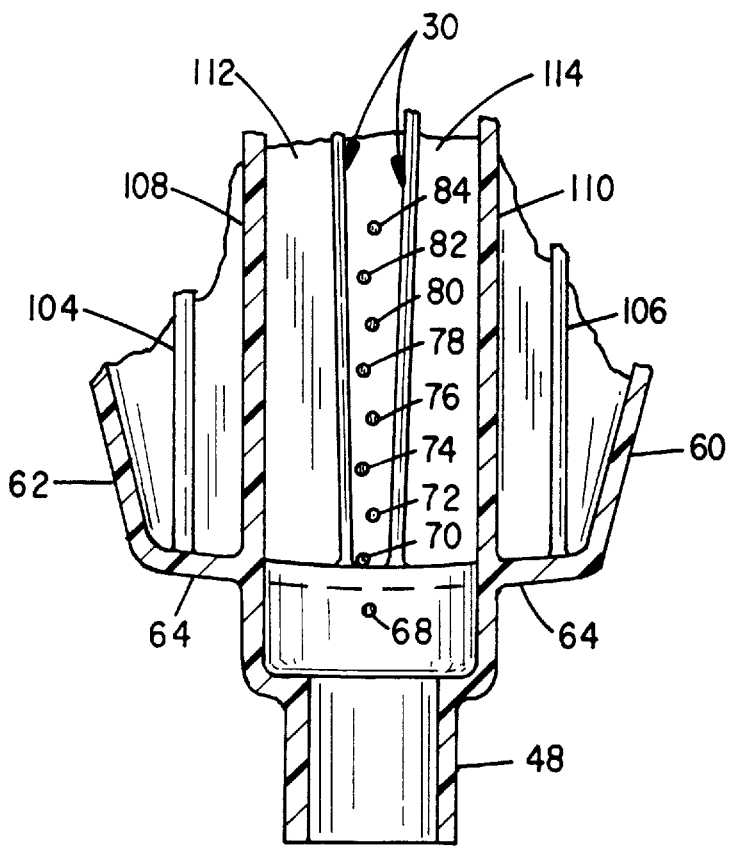
FIG. 9 is an enlarged view of a portion of FIG. 6 illustrating the offset probe arrangement and discharge area of the improved flow meter.

The structural detail of the exterior of the flow meter 10 will now be described with reference to FIGS. 3–5. The upper housing member 12 is generally dome-like in construction and includes a fluid inlet 40 and a flange member 42 having generally trapezoidal purchase points 44, 46 for slidably coupling with the upper portions of the spring clips 18, 20. The lower housing member 14 is similarly constructed with a fluid outlet 48 and a flange member 50 having generally trapezoidal purchase points 52, 54 for slidably coupling with the lower portions of the spring clips 18, 20. The lower housing member 14 has generally a front wall member 56 disposed opposite and generally parallel to a rear wall member 58, and opposing side walls 60, 62 which depend angularly inward from the flange member 50 to a bottom member 64. A generally rectangular flange member 66 is provided extending perpendicularly outward from the rear wall member 58. Within the perimeter defined by the flange member 66 are the terminal ends of a base probe member 68, a first probe member 70, a second probe member 72, a third probe member 74, a fourth probe member 76, a fifth probe member 78, a sixth probe member 80, a seventh probe member 82, and an eighth probe member 84. As will be set forth in greater particularity below, the probe members 68–84 are generally cylindrical and extend inward through the rear wall member 58 into the measurement chamber 32. The probe members 68–84 are composed of an electrically conductive material, such as stainless steel, and are disposed in staggered and parallel relation to one another to reduce the likelihood of spanning between probes when the fluid level in the measurement chamber 32 rises and falls due to pulsation. Although not shown, the flange member 66 may be equipped with a protective cover member for enclosing the terminal ends of the probe members 68–84 from the environment.

Turning now to FIGS. 6–9, the structural details of the interior of the flow meter 10 are as follows. The baffle plate 16 is substantially flat having a first and second flow aperture 86, 88 formed therethrough on opposing ends of a centrally disposed and upwardly extending deflection member 90. An upper gasket member 92 and a lower gasket member 94 are provided on either side of the baffle plate 16 so as to establish a fluid tight seal between the baffle member 16 and the upper and lower housing members 12, 14, respectively, when the spring clips 18, 20 are snapped into place over the purchase points 46, 54 and 44, 52. The velocity reduction chamber 26 is defined between the upper housing member 12 and the baffle plate 16. The deflection member 90 has generally arcuate and sloping front 96, back 98, and side surfaces 100, 102 which serve to temporarily deflect the pulsatile incoming fluid as shown in phantom in FIGS. 6 and 7 so as to reduce the overall velocity of the fluid prior to passing through the first and second flow apertures 86, 88 into the turbulence reduction chamber 28. The turbulence reduction chamber 28 is bounded vertically between the baffle member 16 and the bottom member 64, horizontally between the angularly depending side walls 60, 62, and laterally between the front and rear wall members 56, 58. The turbulence reduction chamber 28 includes first and second baffle walls 104, 106 extending in vertically parallel fashion from the front wall member 56 of the lower housing member 14. The first and second flow apertures 86, 88 in the baffle plate 16 are situated such that fluid passing through the first flow aperture 86 flows directly in the channel defined between the first baffle wall 104 and the side wall 62, while the fluid passing through the second flow aperture 88 flows directly in the channel defined between the second baffle wall 106 and the side wall 60. The bottom member 64 slopes downwardly at all points such that the fluid therein is forced to meander around the first and second baffle walls 104, 106 as shown in phantom in FIG. 8, thereby reducing the turbulence of the fluid prior to passing to the measurement chamber 32.

The measurement chamber 32 comprises an elongated and generally rectangular housing formed by first and second side walls 108, 110 extending inward from the rear wall 58 of the lower housing member 14, a first end wall 112 extending medially inward from the first side wall 108, and a second end wall 114 extending medially inward from the second side wall 110. The opposing edges of the first and second end walls 112, 114 define the metered orifice 30 leading into the measurement chamber 32. The opposing edges of the first and second end walls 112, 114 angle generally inward as they extend from the interior of the measurement chamber 32 towards the turbulence reduction chamber 28. The opposing edges of the first and second end walls 112, 114 also extend from the bottom member 64 of the housing member 14 in a vertically divergent fashion such that the resulting metered orifice 30 has a generally tapered shape. In an important aspect, the angling of the opposing edges of the first and second end walls 112, 114 provides a clean transition for the fluid flowing from the turbulence reduction chamber 28 into the measurement chamber 32 and the vertically tapered shape of the metered orifice 30 aids in proper flow rate determinations. The base probe 64 is positioned slightly below the plane of the metered orifice 30 at the approximate horizontal midline of the measurement chamber 32, while probes 70–84 are disposed within the measurement chamber 32 above the bottom plane of the metered orifice 30. As shown particularly in FIGS. 6 and 9, the probes 70–84 are staggered relative to the horizontal midline and are spaced a predetermined and uniform distance from one another. Arranging the probe members 70–84 in staggered fashion reduces the likelihood of spanning between probes when the fluid level in the measurement chamber 32 rises and falls due to pulsation. Disposing the probe members 68–84 equi-distant from each other aids in the accurate assessment of fluid level which for proper determination of flow rate.

Referring now to FIG. 10, shown is a schematic diagram of the improved flow meter illustrating in detail the "adjacent probe" fluid level detection arrangement of the present invention. The microprocessor controller 34 forms the heart of the control circuit, distributing and receiving various control and data signals to coordinate the overall operation of the flow meter 10. In a preferred embodiment, the microprocessor controller 34 is coupled to a display 116 for communicating information to a user, a keyboard 118 for receiving input from a user, an "adjacent probe" fluid level detection circuit designated generally at 120 for detecting instantaneous fluid level within the measurement chamber 32, and a milk temperature sensing circuit 122 for assessing the temperature of the milk passing through the measurement chamber 32. The microprocessor controller 34 may be powered through the use of either a battery module 124 for mobile operation or a DC power supply 126 for stanchion operation. The microprocessor controller 34 may be optionally coupled to supplemental circuits, such as a take-off driver 128 and a vacuum driver 130, and selectively programmed to detect slow or low flow conditions, as well as various alarm functions.

In an important aspect of the present invention, the "adjacent probe" fluid level detection circuit 120, in cooperation with the microprocessor controller 34, continually tracks fluid level within the measurement chamber 32 by applying a predetermined driving signal to a selected one of the probe members 68–82 while monitoring the immediately superior probe member to determine whether continuity is established therebetween within a given time period. Continuity between the selected pair of adjacent probe members will only be established if the fluid level within the measurement chamber 32 is such that the fluid therein contacts both probe members simultaneously. Therefore, if continuity is detected it indicates that the fluid level within the measurement chamber 32 is at least as high as the uppermost probe member of the selected pair of adjacent probe members. Conversely, if continuity is not detected it indicates that the fluid level within the measurement chamber 32 is lower than the uppermost probe member of the selected pair of adjacent probe members. Based on this continuity information, the microprocessor controller 34 then selectively re-directs the predetermined driving signal to one of the immediately superior probe member (if continuity was established) and the immediately inferior probe member (if continuity was not established). The aforementioned process is then repeated to assess continuity between the newly selected pair of adjacent probe members to once again gain an indication of fluid level relative to that particular pair of adjacent probe members. The foregoing steps are repeated in quick succession such that the fluid level within the measurement chamber 32 can be accurately tracked irrespective of the pulsatile, turbulent nature of the fluid flow. By tracking the fluid level within the measurement chamber 32 in this fashion, the microprocessor controller 34 may easily render a highly accurate determination of flow rate.

The "adjacent probe" fluid level detection circuit 120 forms an important aspect of the present invention and is therefore described with particularity as follows. A first multiplexer 132 and a second multiplexer 134 are configured to receive probe select input data in parallel from the microprocessor controller 34 via probe select lines 136. The first multiplexer 132 is further coupled to a driving circuit 138 via an input line 140 and to the probe members 68–82 via output lines 142. The second multiplexer 134 is coupled to probe members 70–84 via input lines 144 having filtering capacitors C1–C8 disposed therealong and to an impedance threshold detection circuit 146 via an output line 148. The driving circuit 138 is coupled to the microprocessor controller 34 via a line 150 and to a voltage reference circuit 152 via lines 154, 156. A current limiting resistor R1 is provided extending between line 150 and ground. The driving circuit 138 includes a first amplifier A1 and a second amplifier A2 configured in a push-pull relationship with a pnp transistor Q1. More specifically, the inverting input of amplifier A1 and the non-inverting input of amplifier A2 are tied together and coupled to line 150, the non-inverting input of amplifier A1 is coupled to a first node 158 of the voltage reference circuit 152, and the inverting input of the amplifier A2 is coupled to a second node 160 of the voltage reference circuit 152. The output of the amplifier A1 and the base of the transistor Q1 are coupled together with a resistor R3. The emitter of the transistor Q1 is tied to power supply +V, while the collector is tied to the output of the amplifier A2 with a resistor R2 and to the first multiplexer 132 via line 140. The voltage reference circuit 152 is a voltage divider having a resistor R4 extending between the power supply +V and the first node 158, a resistor R5 extending between the first node 158 and the second node 160, a resistor R6 extending between the second node 160 and ground, and a capacitor C9 extending from the first node 158 to ground. The second node 160 is coupled directly to the inverting input of an amplifier A3, while the first node 158 is coupled to the non-inverting input of an amplifier A4 via a resistor R7. A resistor R8 further couples the non-inverting input of amplifier A4 to the output thereof for return to the microprocessor controller 34 via line 162. The inverting input of the amplifier A4 is coupled to the output of the amplifier A3 via a diode D1. A resistor R9 is provided between the power supply +V and the anode of diode D1, while a capacitor C10 extends between the anode of diode D1 and ground. The non-inverting input of the amplifier A3 is coupled to the second multiplexer 134 via a line 148 which includes a resistor R10 extending to ground.

In operation, the microprocessor controller 34 selectively transmits a pulsed driver enable signal to the driving circuit 138 on line 150. The push-pull arrangement of the driving circuit 138, in turn, generates a driving signal on line 140 for transmission to the first multiplexer 132. The first multiplexer 132 selectively directs the driving signal received on line 140 to a preselected one of the probe members 68–82 depending upon the probe select data being transmitted to the first and second multiplexers 132, 134 on probe select lines 136. Due to the parallel and shifted coupling between the output lines 142 and input lines 144, the second multiplexer 134 establishes electrical communication between the impedance threshold detection circuit 146 and the probe member located immediately superior to the probe member receiving the driving signal from the first multiplexer 132. The impedance threshold detection circuit 146 interrogates the return signal on line 148 to determine whether the driving signal being applied to the lower probe member of the adjacent pair is received at the upper probe member of the adjacent pair during the application of the driving signal. It will be appreciated that the driving signal will only be received at the upper probe member of the adjacent pair if electrical continuity is established therebetween. With the probe members 68–84 disposed in a vertically spaced fashion within the measurement chamber 32, electrical continuity between any pair of adjacent probe members will only be established if the fluid level within the measurement chamber 32 is such that fluid establishes a conductive path therebetween. As such, if the driving signal is received at the upper probe member it indicates that the fluid level within the measurement chamber 32 is at least as high as the upper probe member of the selected adjacent pair. Conversely, if the driving signal is not received at the upper probe member it indicates that the fluid level within the measurement chamber 32 is less than the height of the upper probe member. By knowing the vertical location of the probe members 68–84 within the measurement chamber 32, the microprocessor controller 34 is capable of translating this continuity information into an accurate fluid level determination. The microprocessor controller 34, in turn, computes instantaneous flow rate based on the fluid level within the measurement chamber 32, the dimensions of the metered orifice 30, and the dimensions of the fluid outlet 48.

The operation of the impedance threshold detection circuit 146 will now be explained as follows. The signal on the return line 148 will remain in a low or off state unless and until continuity is established between the selected pair of adjacent probe members such that the driving signal applied to the lower probe member of the adjacent pair is received at the upper probe member of the adjacent pair. In a preferred embodiment, the voltage reference circuit 152 is configured such that the voltage level at first node 158 will be approximately two-thirds ($\frac{2}{3}$) of the supply voltage (+V), while the voltage level at the second node 160 will be approximately one-third ($\frac{1}{3}$) of the supply voltage (+V). In that the second node 160 is tied to the inverting input of amplifier A3, the output of amplifier A3 will therefore remain low until the signal on return line 148 causes a voltage drop across resistor R10 which exceeds the voltage at the second node 160. The amplifier A4 is disposed in a normally high configuration such that the output on line 162 will be maintained in a high state until the voltage level at the inverting input thereof exceeds the voltage level at the non-inverting input thereof As such, when continuity is not established between the selected adjacent probe members the voltage drop across resistor R10 will not accrue to exceed the voltage level at the inverting input of amplifier A3 and the resulting output of amplifier A3 will therefore be maintained low. The low output of amplifier A3 consequently shorts out the capacitor C10 and maintains the inverting input of amplifier A4 low such that the output signal on line 162 is maintained high. The microprocessor controller 34 interprets this as representing a lack of continuity between the selected adjacent pair of probe members. In the instance that continuity is established between the selected adjacent probe members, the voltage drop across resistor R10 will accrue to point where it exceeds the voltage level at the inverting input of the amplifier A3 such that the resulting output of amplifier A3 will switch into a high state. The moment the output of amplifier A3 switches into a high state capacitor C10 will begin charging. When the charge within capacitor C10 exceeds the voltage level at the non-inverting terminal of amplifier A4, which in the preferred embodiment is the voltage at second node 160, the output signal on line 162 immediately drops to a low state. The time constant of capacitor C10 is preferably chosen such that its charge will only exceed the voltage at the non-inverting input of amplifier A4 if continuity between the adjacent probe members is maintained for a predetermined duration. In this fashion, the capacitor C10 serves as a filter for screening out momentary continuity hits which may be attributable to causes other than the fluid being at that particular level within the measurement chamber 32.

In a preferred embodiment, the driver enable signal will be applied to the driving circuit 138 for a predetermined period of time unless it is determined within that period that continuity has been established between the selected adjacent pair of probe members. If continuity is detected during the application of the driving signal, the microprocessor controller 34 will stop applying the driver enable signal to the driving circuit 138, increment the probe selection by one level, and thereafter re-apply another driver enable signal to the driving circuit 138. With the probe selection incremented by one level, the first multiplexer 132 will direct the new driving signal to the probe member located directly above the probe member which received the previous driving signal, while the second multiplexer 134 will connect the impedance threshold detection circuit 146 to the probe member located immediately superior to the probe member which receives the new driving signal. If continuity between the adjacent pair of probe members is not detected within a predetermined period of time, such as 20 milliseconds, the microprocessor controller 34 will automatically stop applying the driver enable signal to the driving circuit 138, decrement the probe selection by one level, and thereafter re-apply another driver enable signal to the driving circuit 138. In this case, decrementing the probe selection will cause the first multiplexer 132 to direct the new driving signal to the probe member immediately below the probe member which received the previous driving signal and cause the second multiplexer 134 to connect the impedance threshold detection circuit 146 to the probe member located immediately superior to the probe member which receives the new driving signal.

For example, if the preselected pair of adjacent probe members consists of the fourth and fifth probe members 76, 78, the first multiplexer 132 will direct the pulsed driving signal to the fourth probe member 76 while the second multiplexer 134 establishes a communication link between the fifth probe member 78 and the impedance threshold detection circuit 146. The impedance threshold detection circuit 146 then continuously monitors the signal on line 148 to detect whether the driving signal applied to the fourth probe member 76 is being received at the fifth probe member 78. If the driving signal is received at the fifth probe member 78 within a predetermined period, the impedance threshold detection circuit 146 will produce a low output signal on line 162 indicating to the microprocessor controller 34 that continuity has been established between the fourth and fifth probe members 76, 78. The microprocessor controller 34 will then stop applying the driver enable signal on line 150, increment the probe selection by one such that the newly selected adjacent pair consists of the fifth and sixth probe members 78, 80, and re-apply the driver enable signal to the driving circuit 138. In this arrangement, the first multiplexer 132 directs the new driving signal to the fifth probe member 78 and the second multiplexer 134 connects the sixth probe member 80 with the impedance threshold detection circuit 146 for monitoring continuity therebetween. Conversely, if the driving signal is not received at the fifth probe member 78 within a predetermined period the impedance threshold detection circuit 146 will maintain the normally high output signal on line 162 indicating to the microprocessor controller 34 that continuity has not been established between the fourth and fifth probe members 76, 78. The microprocessor controller 34 will consequently decrement the probe selection by one such that the newly selected adjacent pair consists of the third and fourth probe members 74, 76 and thereafter re-apply the driver enable signal to the driving circuit 138. The first multiplexer 132 will therefore direct the new driving signal to the third probe member 74 while the second multiplexer 134 connects the fourth probe member 76 with the impedance threshold detection circuit 146 for monitoring continuity therebetween. The foregoing sequence will be repeated in quick succession such that the microprocessor controller 34 may accurately track the fluid level within the measurement chamber 32 for subsequent calculation of fluid flow.

The improved milk temperature sensing arrangement of the present invention will now be described as follows. As shown generally in FIG. 10, the temperature sensing circuit 122 is coupled to a temperature sensing element 164 disposed within a bore formed in the base probe member 68 via a line 166 and to the microprocessor controller 34 via a line 168. The position of the temperature sensing element 164 within the base probe 68 forms an important aspect of the present invention in that milk temperature is sensed at a point in close proximity to the actual cow being milked to thereby provide an indirect yet accurate assessment of cow temperature. The microprocessor controller 34 monitors the output of the temperature sensing circuit 122 on line 168 and serves to track the milk temperature within the measurement chamber 32 during the milking of each cow. The microprocessor controller 34 may be optionally configured to automatically store all or selective portions of the milk temperature data obtained by the temperature sensing circuit 122. In this fashion, the history for each cow can be analyzed to determine trends and/or indicate which animals should be replaced within the milk production herd. The temperature sensing element 164 can be any number of commercially available linear or non-linear temperature sensing devices, including but not limited to thermistors and temperature dependent resistors.

With reference to FIG. 11, shown is a schematic diagram illustrating in detail the milk temperature sensing circuit 122 shown generally in FIG. 10. The temperature sensing element 164 is disposed within the base probe member 68 as shown in phantom. A current source circuit 170 is provided including a pnp transistor Q2, an amplifier A5, a zener diode D2, and resistors R11 and R12. The base of the transistor Q2 is tied directly to the output of amplifier A5. The emitter of the transistor Q2 is tied to the inverting input of amplifier A5 and to the power supply (+V) through the resistor R12. The non-inverting input of the amplifier A5 is tied to the junction between the zener diode D2 and the resistor R11, wherein the zener diode D2 is tied to the power supply (+V) and the resistor R11 is tied to ground. The collector of the transistor Q2 is tied to the temperature sensing element 164 via line 166. In addition to being connected to the temperature sensing element 164, the current source circuit 170 is further coupled to the inverting input of an amplifier A6 via a resistor R13 and to a capacitor C11 coupled to ground. The inverting input and the output of the amplifier A6 are coupled together with a resistor R14 disposed in parallel to a capacitor C12. The non-inverting input of the amplifier A6 is coupled temperature calibration circuit 172 comprising a resistor R17, a resistor R18, and a capacitor C14. The resistor R18 and capacitor C14 are tied to ground, while the resistor R17 is tied to a potentiometer resistor R16. The potentiometer R16 is further tied to ground and to the output of an amplifier A7. The amplifier A7 is configured as a buffer with the output tied to the inverting input and the non-inverting input tied to a resistor R15, a capacitor C13, and a zener diode D3. The capacitor C13 and the zener diode D3 are tied to ground while the resistor R15 is coupled to the power supply (+V).

The voltage signal generated by the temperature sensing element 164 is derived from the constant current source circuit 170. Due to the resulting voltage drop across resistor R13, then, the current level at the inverting input of amplifier A6 varies in proportion to the sensor signal generated by the temperature sensing element 164. The temperature calibration circuit 172 advantageously allows the voltage level at the non-inverting input of amplifier A6 to be selectively set so as to provide a meaningful voltage reference from which accurate temperature measurements may be derived based on the output of the temperature sensing element 164. More specifically, the potentiometer resistor R16 may be selectively adjusted to modify the voltage divider established by the resistors R17 and R18 to thereby produce a specific voltage level at a node 174 coupled to the non-inverting input of the amplifier A6. With the voltage at the non-inverting input maintained at a predetermined level in this fashion, any variations in the voltage level at the inverting input due to temperature changes results in a corresponding change in the analog output from the amplifier A6. In that average cow temperature is approximately 101 degrees Fahrenheit, the temperature calibration circuit 172 is preferably calibrated such that the voltage level at the non-inverting input of the amplifier A6 provides an appropriate reference for covering a temperature range between 90 and 115 degrees Fahrenheit. The microprocessor controller 34 continuously receives the output of the temperature sensing circuit 122 via line 168 and, in a preferred embodiment, samples this output signal on the order of 10 times per second to provide a digital readout of the temperature on the display 116 shown in FIG. 10.

In light of the foregoing, the improved flow meter of the present invention boasts several distinct advantages of the known prior art. First, the improved flow meter advantageously employs an improved fluid level detection arrangement for accurately tracking the fluid level within the measurement chamber so as to provide more reliable determinations of flow rate. Second, the improved flow meter advantageously includes an internally disposed temperature sensing element which, in conjunction with the aforementioned temperature sensing circuit, provides the ability to accurately monitor the temperature of the milk within the flow meter so as to provide a more reliable indirect assessment of cow temperature than has heretofore been provided.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself

What is claimed is:

1. An improved flow meter for determining flow rates of pulsatile fluid flow, comprising:

a fluid housing having a fluid inlet, a fluid outlet, a velocity reduction chamber in communication with said fluid inlet, a turbulence reduction chamber in communication with said velocity reduction chamber, and a fluid measurement chamber in communication with said velocity reduction chamber and said fluid outlet, said fluid measurement chamber having a plurality of electrically conductive probe members disposed in vertically spaced relation therewithin;

temperature measurement means consisting of one of a non-linear resistive temperature sensing element and a linear resistive temperature sensing element disposed proximate said fluid outlet for monitoring the temperature of said fluid which passes through fluid outlet;

means for electrically determining conductivity between a preselected adjacent pair of said plurality of probe members as a measure of the level of fluid within said measuring compartment; and means for converting said electrically conductive readings from said means for determining conductivity to a visual readout correlating to the flow of fluid through said fluid measurement chamber.

2. The improved flow meter as set forth in claim 1 and further, said plurality of probe members including a base probe member disposed proximate said fluid outlet, said base probe having an internally disposed chamber, said temperature measurement means being disposed within said chamber of said base probe.

3. The improved flow meter as set forth in claim 1 and further, said means for electrically determining conductivity between a preselected adjacent pair of said plurality of probe members including means for selectively applying an energizing signal to a preselected one of said plurality of said probe members, and means for monitoring an adjacent probe member to said preselected one of said plurality of probe members to detect if said fluid extends therebetween.

4. An improved flow meter for determining flow rates of pulsed fluids, comprising:

a fluid container of generally hollow construction having a fluid inlet, a fluid outlet, and a fluid measurement chamber disposed between said fluid inlet and said fluid outlet having a plurality of vertically spaced probe members disposed therewithin including a base probe member disposed proximate said fluid outlet and having an internal chamber; and processing means communicatively linked to said plurality of probe members for automatically tracking a fluid level within said fluid measurement chamber based on the conductivity of said fluid extending between each pair of vertically adjacent probe members and for correlating said fluid level within said fluid measurement chamber to determine a flow rate of said fluid passing through said fluid measurement chamber; and temperature sensing means disposed proximate said fluid outlet is the internal chamber of the base probe member and communicatively linked to said processing means for sensing the temperature of said fluid passing through said fluid outlet.

5. The improved flow meter as set forth in claim 4 and further, including probe selection means for selecting a common probe member from said plurality of probe members and an adjacent probe member immediate to said common probe member, means for applying a driving signal to said common probe member, means for monitoring said adjacent probe to determine if electrical conductivity is established between said common probe member and said adjacent probe as provided by said fluid level, and means for re-selecting said common probe from said plurality of probe members depending on said determination of electrical conductivity.

6. The improved flow meter as set forth in claim 4 and further, including display means electrically connected to said processing means for displaying said flow rate of said fluid passing through said fluid measurement chamber, said processing means including storage means for recording said flow rate over a predetermined period of time.

7. The improved flow meter as set forth in claim 4 and further, said temperature sensing means consisting of one of a non-linear resistive temperature sensing element and a linear resistive temperature sensing element.

8. A method of determining a flow rate of a fluid delivered in a pulsatile flow, comprising the steps of:

(a) providing a fluid housing having a fluid inlet, a fluid outlet, a velocity reduction chamber in communication with said fluid inlet, a turbulence reduction chamber in communication with said velocity reduction chamber, a fluid measurement chamber in communication with said velocity reduction chamber and said fluid outlet, and a plurality of electrically conductive probe members disposed in vertically spaced relation within said fluid measurement chamber;

(b) tracking the electrical conductivity between adjacent pairs of said plurality of probe members to determine an instantaneous fluid level within said fluid measurement compartment by:

(i) selecting a common probe from said plurality of said probe members;

(ii) supplying a drive signal to said common probe;

(iii) monitoring the fluid conductivity between said common probe and an adjacent probe to said common probe to produce a continuity output signal; and (iv) selecting another common probe from said plurality of probe members depending the state of said continuity output signal; and (c) calculating a flow rate based on said instantaneous fluid level within said measurement means.

* * * * *

UNITED STATES PATENT AND TRADEMARK OFFICE
CERTIFICATE OF CORRECTION

PATENT NO. : 5,877,417
DATED : March 2, 1999
INVENTOR(S) : Lawrence C. Arvidson; Duane A. Brown; Greg N. Hahn It is certified that error appears in the above-identified patent and that said Letters Patent is hereby corrected as shown below:

```
On the title page, [75] Inventors
  Insert after "Lawrence C. Arvidson, New Brighton;
               Duane A. Brown, Rockford, both of Minn."

--            Greg N. Hahn, of Stoughton, Wi --.
```

Signed and Sealed this

Twenty-ninth Day of June, 1999

Attest:

Q. TODD DICKINSON

Attesting Officer  Acting Commissioner of Patents and Trademarks